United States Patent [19]

Chatelin et al.

[11] Patent Number: 5,266,632
[45] Date of Patent: Nov. 30, 1993

[54] GRAFTING REACTION SYSTEM AND GRAFTING PROCESS

[75] Inventors: Roger Chatelin, Lisseux/Lozanne; Louis Gavet, Lyons, both of France

[73] Assignee: Institue Textile de France, Bagneux, France

[21] Appl. No.: 527,943

[22] Filed: May 24, 1990

Related U.S. Application Data

[63] Continuation-in-part of Ser. No. 159,512, Feb. 18, 1988, abandoned, which is a continuation of Ser. No. 935,837, Nov. 28, 1986, abandoned.

[30] Foreign Application Priority Data

Nov. 28, 1985 [FR] France .................................. 85 17612

[51] Int. Cl.$^5$ .............................................. C08F 283/00
[52] U.S. Cl. .................................... 525/543; 525/261; 525/262; 525/274; 525/291; 525/302; 525/426; 525/904
[58] Field of Search ............... 525/904, 261, 543, 262, 525/274, 291, 302, 426

[56] References Cited

U.S. PATENT DOCUMENTS

| | | | |
|---|---|---|---|
| 3,226,454 | 12/1965 | Marans | 525/904 |
| 3,488,268 | 1/1970 | Tanner | 522/47 |
| 3,855,353 | 12/1974 | Alberts et al. | 525/302 |
| 3,984,495 | 10/1976 | Okamura et al. | 525/57 |
| 3,984,515 | 10/1976 | Mommaerts et al. | 264/182 |
| 4,065,256 | 12/1977 | Igeta et al. | 525/291 |
| 4,299,940 | 11/1981 | Wei | 526/278 |
| 4,311,573 | 1/1982 | Mayhan et al. | 525/904 |
| 4,506,056 | 3/1985 | Gaylord | 524/445 |

FOREIGN PATENT DOCUMENTS 853971 11/1960 United Kingdom .
876535 9/1961 United Kingdom .

*Primary Examiner*—Ralph H. Dean
*Attorney, Agent, or Firm*—Dennison, Meserole, Pollack & Scheiner

[57] ABSTRACT

A grafting reaction system comprises an activated polymer and a grafting medium containing a monomer, with the system containing free radicals. The system further comprises 0.1 to 2% by weight of the grafting medium and monomer of a homopolymerization inhibitor compound, the inhibitor compound comprising a compatabilizing function toward the grafting medium which is selected from the group consisting of sulfonic, carboxylic and phenolic groups, and an inhibiting function which acts as a transfer agent for the free radicals, the inhibiting function being an allyl-type unsaturated group. The inhibitor compound has a diffusing capacity through the grafting medium which is greater than its diffusing capacity through the polymer.

18 Claims, No Drawings

GRAFTING REACTION SYSTEM AND GRAFTING PROCESS

This application is a continuation-in-part of U.S. patent application Ser. No. 159,512, filed Feb. 18, 1988, which is a continuation of U.S. patent application Ser. No. 935,837, filed Nov. 28, 1986, both now abandoned.

The present invention relates to a grafting reaction system comprising an activated polymer and a grafting medium containing a monomer, said system containing free radicals and a homopolymerization inhibitor agent. It further relates to a grafting process which uses a homopolymerization inhibitor agent and a process for inhibiting homopolymerization in a grafting reaction by free radicals.

A wellknown grafting technique consists in activating the polymer material to be grafted and in placing the activated material in contact with the monomer, in solution for example, in very specific temperature and time conditions. The effect of activation is to create on the material radical species, from which the monomer polymerization reaction proceeds.

One difficulty encountered during a grafting reaction resides in the homopolymerization, i.e. the self-polymerization of the monomer from free-radical species present in the medium containing the monomer. This phenomenon is normal, and the solution consists in eliminating the formed homopolymer by washing the grafted material. This solution, however, is not altogether satisfactory insofar as there is an over-consumption of monomer compared with the actual rate of grafting, and insofar as it requires one or more additional operations.

To limit this stray homopolymerization, it has been suggested to use inhibitors, which are known to prevent the development of polymerization reactions, such as hydroquinone, hydroquinone methyl ether, or tertiobutylpyrocatechol. Such inhibitors are used when storing pure monomers; they catch the free-radical species contained in the medium so that the monomer does not self-polymerize. However, in the case of a grafting reaction such as described hereinabove, said inhibitors also inhibit the free radical positions necessary for the grafting and carried either by the polymer material itself after activation, or by the growing grafted chain. Therefore the action of these inhibitors is such that they block the start or the propagation of the grafting reaction.

Attempts have been made to overcome this disadvantage, in document GB-A-853971 by selecting from the conventional inhibitor agents, an agent acting selectively on the grafting monomer comparatively to the polymer to be grafted. Said inhibitor agent comprises a comptabilizing function towards the grafting medium, having a polarity which makes it soluble in the monomer phase; moreover it disperses more readily by diffusion in the monomer phase than in the polymer phase.

According to the Applicant however, said inhibitor agent also has a sudden effect which affects the grafting reaction.

A grafting reaction system has now been found and this is the object of the present invention, in which homopolymerization is limited. Conventionally, this system comprises free radicals as well as an activated polymer and a grafting medium containing a monomer. According to the invention, it comprises between 0.1 and 2% by weight of a homopolymerization inhibitor compound, with respect to the grafting medium and to the monomer, said compound having on the one hand, a compatibilizing function in view of the grafting medium, which function is selected from the sulphonic, carboxylic and phenolic groups, and on the other hand, an inhibitor function acting as free radicals-transferring agent and consisting in an allyl type unsaturated group, said component having a higher capacity of diffusion through the grafting medium than its capacity of diffusion through the polymer.

The allyl type unsaturated group has the general formula

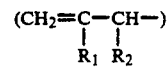

in which $R_1$ and $R_2$ are either H or $CH_3$. It comprises in particular the 2-methyl-propene group of formula

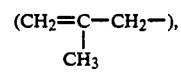

which is an allyl type group preferred according to the invention.

Document U.S. Pat. No. 3,984,495 is known to use, in a copolymerization reaction followed by a grafting reaction, compounds comprising an unsaturated function such as a vinyl group ($CH_2$=$CH$—), an allyl group ($CH_2$=$CH$—$CH_2$—), an acryl group ($CH_2$=$CH$—$COO$—) or an acrylamide group ($CH_2$=$CH$—$CONH$—) and a compatibilizing function such as a sulphonic function. But in the case described in this document, said compounds are used as polymerizable monomers which take part in the copolymerization reaction to produce a copolymer; this copolymer is thereafter grafted with another grafting monomer, the vinyl chloride.

Document U.S. Pat. No. 4,065,256 describes a reaction grafting medium involving naphthalene as additive to an organic solvent with one or more unsaturated monomers with double bond capable of being involved in a radical polymerization. This document gives numerous examples, among which compounds which have unsaturated functions such as acrylic, acrylamide or vinyl groups, and also sulfonic groups.

Thus in the two cited documents, the compounds which have an unsaturated, for example an acrylic, vinyl or allyl group, and a solubilizing function, such as of the sulfonic group, are used as polymerizable monomers, participating as such to the polymerizing or grafting reaction.

In the grafting reaction system according to the invention and quite unexpectedly, the compounds with an allyl type group and a compatibilizing function are used, not as polymerizable monomers but as inhibitor agents as regards the formation of homopolymers in the radical grafting reaction, when they are used in small proportions of 0.1 to 2% in a grafting medium containing at least one other monomer.

It is emphasized that from all the compounds listed in documents U.S. Pat. No. 3,984,495 and U.S. Pat. No. 4,065,256, only those which have an allyl-type unsaturated function can be suitable. Comparative test have been conducted using, on the one hand, the 2-methyl-2-propene sulfonate of formula

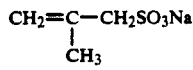

as compound of the invention, and on the other hand a compound with sulfonate groups and acrylamide groups, namely sodium-2-acrylamido-2-methyl-propene sulfonate (AMPS) of formula:

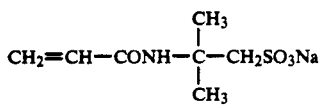

In the case of a textile fiber grafting reaction using acrylic acid as monomer and the operational conditions being strictly identical, the textile fiber grafting rate obtained in the first case was 20%, with a liquid reaction medium and in the second case there was virtually no grafting of the textile fibers, but the formation of a gel in the reaction medium, showing a very high homopolymerization.

Therefore the merit of the invention is to have selected, from a wide range of compounds known to be polymerizable monomers, one category of compounds which, when placed in a small proportion of between 0.1 and 2% in a grafting medium containing at least another polymerizable monomer exhibit inhibiting properties toward the formation of homopolymers during the grafting reaction with free radicals.

Particularly suitable inhibitors according to the invention are sodium 2-methyl-2-propene sulfate, also called sodium methallyl sulfonate (SMAS), sodium 4-(2-methyl-2-propene-yl)-benzene sulfonate, 4-tertiobutyl-benzene allyl ether or allyl acetate.

By compatibilizing function is meant a function which renders the agent compatible with the grafting medium. It is in fact a solubilizing solution when the grafting reaction occurs from a solution, in homogeneous phase, for example the compatibilizing function may be a sulfonic or carboxylic function when the grafting medium is an aqueous solution, or a phenolic function when the grafting medium is a benzene solution. It is an emulsifying function when the grafting reaction occurs from an emulsion; it is possible in this case to use the same functions as above but with lesser efficiency.

The invention will be more readily understood on reading the following description of various examples of grafting.

Two types of activation are used in the described examples. The first type is based on the action of ozone on the polymer material to be grafted, the second on the action of accelerated electrons. These two types of activations, like all the other possible techniques, create active free radicals on the polymer material to be grafted, particularly by radicals coming from the decomposition of a thermolabile hydroperoxide, such as a radical RO., which will initiate the polymerization of the grafting, and also a radical .OH, which, when released in the grafting medium can initiate the polymerization of the monomer itself, hence homopolymerization.

Various polymer materials were grafted: cotton, which is a cellulose material, polyamide, polypropylene.

Various monomers were used for the grafting: acrylic acid, acrylamide, N-vinylpyrrolidone, styrene. In this last case, the grafting medium was an emulsion.

Comparative tests were made with, as inhibitor according to the invention, the sodium 2-methyl-2-propene sulfonate (SMAS) in various proportions, mainly 0.2% by weight with respect to the grafting solution, the sodium 4-(2-methyl-2-propene-yl) benzene sulfonate, the 4-tertiobutyl-benzene allyl ether or the allyl acetate. The inhibitor according to the invention intervenes in the proportion of 0.1 to 2% by weight with respect to the grafting solution.

The description of these tests is not however in any way restrictive of the present invention, and anyone skilled in the art can, with the teachings given herein, use the same inhibitors in other grafting reactions and also use other inhibitors.

1) First series of tests

Three samples of polyamide, each one weighing 10 grammes, were subjected to a flow of 100 liters per hour of an ozone/oxygen mixture, containing 60 milligrammes of ozone per liter. One of the three samples of ozonized polyamide was soaked in an aqueous solution containing 10% acrylamide, bath ratio 1/20, containing no sodium 2-methyl-2-propene sulfonate (SMAS), at a temperature of 100° C. for an hour and a half. After rinsing for half an hour in water at 40° C., the sample weighed 16.8 g, then after extraction with water in a Soxhlet apparatus for eight hours, it weighed 14.5 g.

The grafting rate is defined by the following relation:

$$Gr = \frac{WG - Wo}{Wg}$$

Wo being the initial weight of the sample and Wg being the weight of the sample after grafting and elimination of the homopolymers.

In the aforecited example, where no inhibitor according to the invention was used, Gr is equal to 31%, but during the grafting, a large part of the acrylamide created a certain amount of homopolymer which was eliminated praticularly during the extraction in the Soxhlet apparatus. It should also be noted that the aqueous acrylamide solution had gradually transformed into a gel during the grafting and therefore could not be re-used.

The second sample went through the same treatment as the first, except that the acrylamide solution contained 0.1% of sodium 2-methyl-2-propene sulfonate (SMAS). After the first rinse, it weighed 11.8 g and after extraction in a Soxhlet apparatus, 11.7 g. Gr was 14.5%, therefore lower than in the first sample, but there was very little homopolymer and the acrylamide solution, after grafting, had remained fluid and could therefore be re-used.

The third sample, with a concentration of 0.2% sodium 2-methyl-2-propene sulfonate, gave the same result with a slightly higher Gr, 15.2%.

2) Second series of tests

A polyamide material ozonized in the same conditions as stated hereinabove, was grafted by being soaked in an aqueous solution containing 5% acrylic acid, bath ratio 1/10, and containing no sodium 2-methyl-2-propene sulfonate, at a temperature of 90° C. for two hours. The initial weight of the sample (Wo) was 14.245 g; after rinsing in water, Wo was 16.720 g, namely a consumption of 2.475 g of acrylic acid; after 8 hours of extraction in boiling water, said weight was 15.300 g and, after extraction for 15 hours in mehtanol, it was 15.100 g. Therefore, 1.620 g of acrylic acid were extracted in homopolymer form, compared with the 0.855 g of acrylic acid effectively grafted on the polyamide for a grafting rate Gr of 5.7%.

The same test was conducted with a grafting solution containing 0.2% of sodium 2-methyl-2-propene sulfonate. The Gr was slightly less than 5.1% but the weight of the material remained constant after the three rinses and extractions. The presence of sodium 2-methyl-2-propene sulfonate in the grafting solution only slightly limited the development of the grafting reaction, but on the other hand it prevented homopolymerization, or at least the formed homopolymers had to be very small to be so easily eliminated with the first rinse.

3) Third series of tests

A cotton material ozonized in the same conditions as in the other two tests, was grafted by being soaked in an aqueous solution of acrylic acid at 15%, without sodium 2-methyl-2-propene sulfonate, at a temperature of 100° C. for two hours. It was proceeded to the same rinsing and extraction operations as in the second series of tests. The Gr was 19%, but it was only 1.403 g of monomer which was effectively grafted on 5.992 g of material compared with the 5.093 g of monomer retained after the first rinse in water. The two following extractions permitted the elimination of the excess of homopolymer, namely 3.69 g.

The same test was conducted with a grafting solution containing 0.2% of sodium-2-methyl-2-propene sulfonate. The Gr was clearly under 6.6%, but the weight of the material remained constant after the three rinses and extractions. Therefore there was no formation of any interfering homopolymer.

This example illustrates perfectly the excess-consumption of monomer in grafting reaction without an inhibitor according to the invention, as well as the necessity of carrying out exhaustive extractions in order to eliminate the formed homopolymer. Finally the grafting solution which contains no inhibitor according to the invention, is after two hours in an oven at 100° C., very viscous and hardly re-usable in any subsequent grafting operation.

4) Fourth series of tests

A polypropylene material, ozonized in the same conditions as in the preceding tests but with a gaseous flux at 30° C. (instead of 25° C.) was grafted by being soaked in an aqueous solution of acrylic acid at 15%, bath ratio 1/20, at a temperature of 100° C. for two hours. The grafting solution, containing no sodium 2-methyl-2-propene sulfonate, solidified because of the self-polymerization of the acrylic acid, and it was then impossible to take any measurements.

With 0.2% of sodium 2-methyl-2-propene sulfonate in the grafting solution, it was observed that Gr was 30.4% and that the weight of the sample after rinsing in water did not change when subjected to a second rinse for eight hours in boiling water.

A comparison of the four preceding series of tests illustrates how easy it is for any one skilled in the art to adapt the operational conditions in order to obtain the target grafting rate.

5) Fifth series of tests

A sample of polypropylene material was subjected to an irradiating treatment in the air using accelerated electrons of 750 KeV at a dose of 1 Mrad. The material was stored for three weeks, then it was grafted with a solution of undiluted N-vinyl pyrrolidone, bath ratio 1/10, at a temperature of 110° C. The following table gives the perentage of polymerized monomer in relation to the material weight, on the one hand, by varying the time during which the material was soaked in the grafting solution, and on the other hand, in the presence and in the absence of nitrogen during the grafting, for a grafting solution containing no inhibitor according to the invention and for a solution containing 0.2% of 2,5-dicarboxylic pyridine.

In the case of a solution containing no inhibitor and of a grafting without nitrogen, the percentage of polymerized monomer is much higher than with an inhibitor, but the monomer is a homopolymer, extractable by washing in lukewarm water.

TABLE

| Duration (hr) | % polymerized monomer without nitrogen | | % polymerized monomer with nitrogen | |
|---|---|---|---|---|
| | without inhibitor | with inhibitor | without inhibitor | with inhibitor |
| 0.5 | 0 | 0 | 0 | 0 |
| 1 | 4 | 0 | 0 | 1.4 |
| 1.5 | 10.1 | 0.8 | 5.9 | 8.4 |
| 2 | 16.0 | 3.3 | 9.8 | 17.5 |

In the presence of nitrogen, the formation of homopolymer is also noted when the grafting solution contains no inhibitor; this homopolymerization, on the contrary, disappears with an inhibitor, and what is more, the grafting rate obtained is then clearly higher.

6) Sixth series of tests

A polypropylene material was irradiated in the same conditions as in the preceding test, and then grafted with a styrene emulsion for 2 hours at 100° C., bath ratio 1/5. The styrene emulsion was composed of 5% styrene, 94% water and 1% of emulsifying agent known as SOPROPHOR 3D33. The presence in the grafting medium of 0.1% of sodium 2-methyl-2-propene sulfonate had no significant effect on the grafting rate: 11.5% compared with 12.5% without sodium 2-methyl-2-propene sulfonate, but it had an effect on the formation of homopolymer which was in smaller quantity and easier to eliminate.

7) Seventh series of tests

Two grafting tests were conducted in parallel on polyamide, using a styrene emulsion of concentration 10% and containing 1% of the emulsifying agent SOPROPHOR 3D33. In one of the tests, 0.5% of allyl acetate was added.

Each sample was ozonized beforehand in the condition described in the first tests, and then soaked in the emulsion for one hour at 85° C., the bath ratio being 1/5.

The weight gain obtained after drying the sample grafted without allyl acetate was 33.3%, and it was of 13.8% after extraction in an acetone-benzene mixture (50/50). The last figure represents the grafting rate and the difference between 33.3 and 13.8% is the quantity of homopolymer formed on the material during the reaction.

The same operation carried out in the presence of 0.5% of allyl acetate gave the respective values: 10.2% as weight gain and 9.8% as grafting rate, the total extractible rate being 0.4%. Gr is slightly less in the presence of allyl acetate but the grafted material is free of homopolymer.

8) Eighth series of tests

Cellulosic fibers in paper form of dimensions 20×20 cm were grafted with the monomer (2-acrylamide-2-methyl) sulfonic propene of formula:

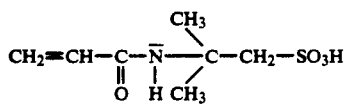

which is initially in the form of a white powder soluble in water.

The monomer solutions had concentrations of 30%.

The paper samples were pre-impregnated with the aforesaid monomer solution, then padded (drying rate: 60%) and placed inside a bag which was then vacuum-sealed. They were then activated by being sent through electron beams at the dose of 1 Mrad.

Immediately after irradiation, the samples were recovered, rinsed in distilled water several times (5 cycles of padding-rinsing,) then dried and weighed.

With the impregnation solutions containing no sodium 4-(2-methyl-2-propene-yl) benzene sulfonate (MPBS), the grafting rate obtained was 3%. It should be noted that after 2 hours at room temperature, the solution used for impregnation had self-polymerized. It had become unusable (Gr=0 after another test 24 hours later).

The solution of (AMPS) containing 0,2% of sodium 4-(2-methyl-2-propene-yl) benzene sulfonate, gave in similar conditions, a Gr of 11.7% during a first test.

The excess of solution remained clear. When re-used after a 24-hour storage, the Gr obtained from the same solution was 11.1%, namely practically the same as that obtained before.

We claim:

1. In a grafting reaction system comprising a solid activated polymer and a liquid grafting medium containing a monomer, said system containing free radicals, the improvement wherein said system further comprises from 0.1 to 2% by weight of the grafting medium of a homopolymerization inhibitor compound, said inhibitor compound comprising a compatibilizing function toward the grafting medium, said compatibilizing function selected from the group consisting of sulfonic and carboxylic groups and an inhibiting function which acts as a transfer agent for said free radicals, said inhibiting function being an allyl or methallyl unsaturated group, said inhibitor compound having a diffusing capacity through said grafting medium which is greater than its diffusing capacity through said polymer.

2. System as claimed in claim 1 wherein the allyl or methallyl unsaturated group is the 2-methyl-propene group.

3. System as claimed in claim 1 wherein the inhibitor compound is sodium 2-methyl-2-propene sulfonate.

4. System as claimed in claim 1 wherein the inhibitor compound is sodium-4-(2-methyl-2-propene-yl)-benzene sulfonate.

5. System as claimed in claim 1 wherein the inhibitor compound is allyl acetate.

6. System as claimed in claim 1 wherein the grafting medium contains acrylamide or acrylic acid as said monomer.

7. In a grafting process comprising reacting a solid activated polymer with a monomer contained in a liquid grafting medium, in the presence of free radicals, the improvement comprising inhibiting homopolymerization of said monomer by reacting said activated polymer and monomer in the presence of from 0.1% to 2% by weight of the grafting medium of a homopolymerization inhibitor compound, said inhibitor compound comprising a compatibilizing function toward the grafting medium, said compatibilizing function selected from the group consisting of sulfonic and carboxylic groups and an inhibiting function which acts as a transfer agent for said free radicals, said inhibiting function being an allyl or methallyl unsaturated group, said inhibitor compound having a diffusing capacity through said grafting medium which is greater than its diffusing capacity through said polymer.

8. Process as claimed in claim 7 wherein the allyl or methallyl group is the 2-methyl propene group.

9. Process as claimed in claim 8 wherein the inhibitor compound is sodium 2-methyl-2-propene sulfonate.

10. Process as claimed in claim 2 wherein the inhibitor compound is sodium 4-(2-methyl-2-propene-yl)-benzene sulfonate.

11. Process as claimed in claim 7 wherein the inhibitor compound is allyl acetate.

12. Process as claimed in claim 7 wherein the grafting medium contains acrylamide or acrylic acid as said monomer.

13. Process for inhibiting monomer homopolymerization in a grafting reaction of an activated polymer and monomer, comprising: forming a liquid grafting medium containing a monomer and a homopolymerization inhibitor compound comprising a compatibilizing function toward the grafting medium, said compatibilizing function selected from the group consisting of sulfonic and carboxylic groups, and an inhibiting function which acts as a transfer agent for free radicals, said inhibiting function being an allyl or methallyl unsaturated group, said inhibitor compound having a diffusing capacity through said grafting medium which is greater than its diffusing capacity through said polymer; adding to said medium an activated solid polymer; and reacting said activated solid polymer and said monomer in the presence of said homopolymerization inhibitor compound, wherein said homopolymerization inhibitor compound is present at a level of 0.1-2% by weight of the grafting medium and monomer.

14. Process as claimed in claim 13 wherein the allyl or methallyl group is the 2-methyl propene group.

15. Process as claimed in claim 14 wherein the inhibitor compound is sodium 2-methyl-2-propene sulfonate.

16. Process as claimed in claim 13 wherein the inhibitor compound is sodium 4-(2-methyl-2-propene-yl)-benzene sulfonate.

17. Process as claimed in claim 13 wherein the inhibitor compound is allyl acetate.

18. Process as claimed in claim 13 wherein the grafting medium contains acrylamide or acrylic acid as said monomer.

* * * * *